(No Model.)
J. HANSE.
BIDET.
No. 302,334. Patented July 22, 1884.
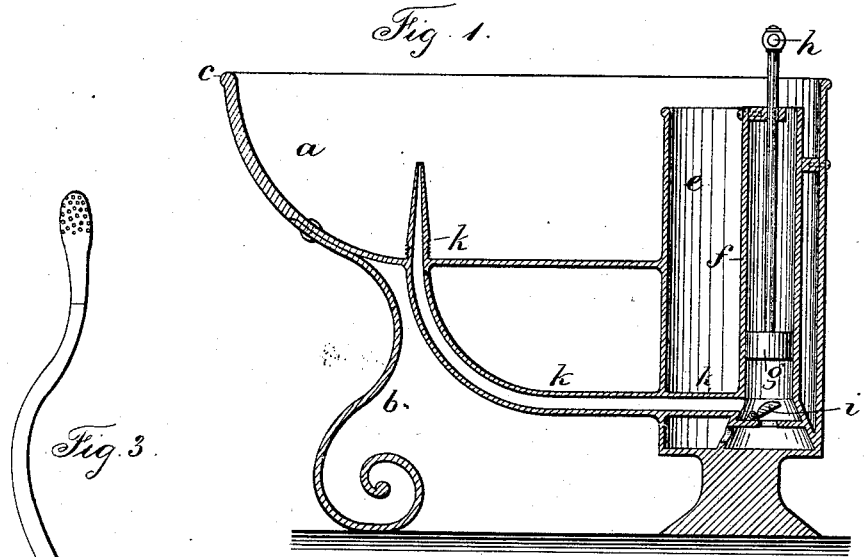
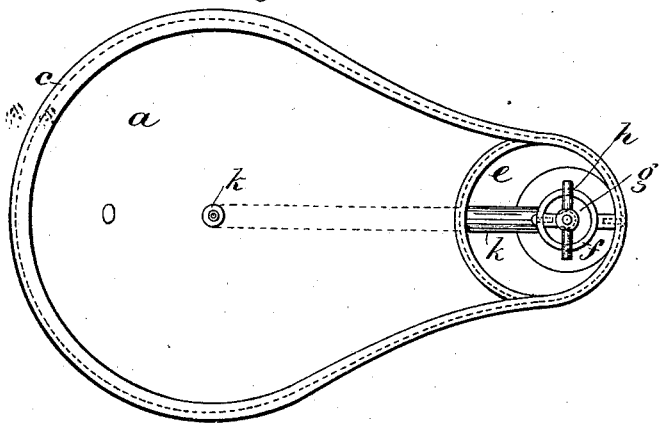
Witnesses
J. Staub
Chas H. Smith
Inventor
James Hanse
per Lemuel W. Serrell
Atty

UNITED STATES PATENT OFFICE.

JAMES HANSE, OF BROOKLYN, NEW YORK, ASSIGNOR TO HIMSELF AND JAMES FOLEY, OF SAME PLACE.

BIDET.

SPECIFICATION forming part of Letters Patent No. 302,334, dated July 22, 1884.

Application filed January 25, 1884. (No model.)

*To all whom it may concern:*

Be it known that I, JAMES HANSE, of Brooklyn, in the county of Kings and State of New York, have invented an Improvement in Portable Bidets, of which the following is a specification.

Bidets have been made in the form of an oval or an elongated pan especially intended for the washing of the person in the cases of piles or urinary or vaginal difficulties. The pans are sometimes set upon legs to raise them to a convenient height.

Bidet attachments have been made for water-closets, consisting of a pipe with a rose or jet at the end and a cock by which water can be turned on for washing the person. My present invention is for supplying a jet of water or other material against the person, in a convenient and portable apparatus adapted to private houses and hospitals, and especially to cases where the patient is not able to walk any distance to a water-closet.

In the drawings, Figure 1 is a vertical section. Fig. 2 is a plan of my improved portable bidet, and Fig. 3 shows the flexible tube and nipple.

The pan *a* is of any usual or convenient shape, usually rounding at one end and contracted toward the other end, and made with broad rounding edges, so that a person can sit upon the pan, the narrower end of the pan being to the front. The legs *b* are of such a length and shape as to properly support the pan at a convenient height from the floor. At one end of the pan is a vertical receiving-vessel, *e*, permanently connected to the pan *a*, and containing within it the barrel *f* and plunger *g*, with a handle, *h*, forming a syringe, and at *i* is an inlet-valve, and *k* is a pipe leading from the syringe up through the bottom of the pan *a*, and terminating in a jet tube or rose. There may be a movable rubber or flexible tube, *k'*, applied to the upper end of the tube *k*, and either slipped over or secured by a coupling, and at the other end of this rubber tube a nipple or injector-nozzle of any desired character. It will now be understood that warm water, or soap and water, or any medicinal substances may be placed in the vessel *e* and pumped as an injection into the rectum or vagina, or the water may be injected against the person, and the pan will prevent any of the injected material being spilled, and the injection can be given by the person alone, because the syringe or pump is in a convenient position for the person to use while seated upon the bidet.

I am aware that a water-holder and a pump have been used to supply water into a basin or to wash out a closet or commode.

In my device the water-jet is directed upwardly from the bottom of the basin, so as to be adapted to use as a bidet, and the same is portable, and can be used with any desired liquid.

I claim as my invention—

1. The portable bidet having a pan, *a*, and supporting-legs, in combination with a vessel affixed to one side of the pan, a pump in the same, and a pipe leading into the pan with an upward discharge-nozzle, substantially as specified.

2. The portable bidet composed of a pan, a pipe in the pan with an upward discharge, a vessel attached at one side for holding liquid, and a pump in the same connected with the bidet-pipe in the pan, substantially as specified.

3. The portable bidet-pan of an elongated form, a vertical vessel at the smaller end of the pan, a pump, and a pipe leading into the pan, substantially as specified, so that the pump can be operated by a person when seated on the pan, as set forth.

Signed by me this 19th day of January, A. D. 1884.

JAMES HANSE.

Witnesses:
GEO. T. PINCKNEY,
WILLIAM G. MOTT.